US010934213B2

(12) United States Patent
Jingjid et al.

(10) Patent No.: US 10,934,213 B2
(45) Date of Patent: Mar. 2, 2021

(54) CEMENTITIOUS ADHESIVE COMPOSITION

(71) Applicant: SIKA TECHNOLOGY AG, Baar (CH)

(72) Inventors: Sorada Jingjid, Singapore (SG); Matthieu Duval, Kuala Lumpur (MY); Didier Lootens, Küssnacht (CH)

(73) Assignee: SIKA TECHNOLOGY AG, Baar (CH)

( * ) Notice: Subject to any disclaimer, the term of this patent is extended or adjusted under 35 U.S.C. 154(b) by 242 days.

(21) Appl. No.: 16/065,238

(22) PCT Filed: Dec. 20, 2016

(86) PCT No.: PCT/EP2016/082036
§ 371 (c)(1),
(2) Date: Jun. 22, 2018

(87) PCT Pub. No.: WO2017/108865
PCT Pub. Date: Jun. 29, 2017

(65) Prior Publication Data
US 2019/0161408 A1 May 30, 2019

(30) Foreign Application Priority Data
Dec. 22, 2015 (EP) ..................................... 15202191

(51) Int. Cl.
C04B 28/04 (2006.01)
C04B 14/06 (2006.01)
C04B 24/08 (2006.01)
C04B 24/26 (2006.01)
C04B 24/38 (2006.01)
C04B 40/00 (2006.01)
C04B 111/00 (2006.01)
C04B 103/30 (2006.01)
C04B 103/50 (2006.01)

(52) U.S. Cl.
CPC .............. C04B 28/04 (2013.01); C04B 14/06 (2013.01); C04B 24/08 (2013.01); C04B 24/2623 (2013.01); C04B 24/2647 (2013.01); C04B 24/383 (2013.01); C04B 40/0028 (2013.01); C04B 2103/30 (2013.01); C04B 2103/50 (2013.01); C04B 2111/00146 (2013.01); C04B 2111/00482 (2013.01); C04B 2111/00637 (2013.01)

(58) Field of Classification Search
None
See application file for complete search history.

(56) References Cited

U.S. PATENT DOCUMENTS

| 3,678,645 A | 7/1972 | Valdes |
| 7,875,113 B2 | 1/2011 | Hughes |
| 9,074,381 B1 | 7/2015 | Drew |
| 2010/0190888 A1* | 7/2010 | Gaeberlein ............. C04B 28/02 524/5 |
| 2012/0318434 A1* | 12/2012 | Kim-Habermehl ..... C04B 28/04 156/71 |
| 2013/0295378 A1 | 11/2013 | Bonin et al. |
| 2014/0345498 A1 | 11/2014 | Konishi et al. |
| 2014/0371351 A1* | 12/2014 | Dantin ................ C04B 24/2652 524/5 |

FOREIGN PATENT DOCUMENTS

| CN | 101333097 A | 12/2008 |
| DE | 19812247 A1 | 9/1999 |
| DE | 19821612 A1 | 11/1999 |
| DE | 10 2010 062 061 A1 | 5/2012 |
| EP | 2537818 A2 | 12/2012 |

OTHER PUBLICATIONS

Feb. 27, 2020 Office Action issued in Colombian Patent Application No. NC2018/0006616.
Sep. 30, 2019 Office Action issued in European Patent Application No. 16812778.5.
Jun. 25, 2019 Office Action issued in Singaporean Patent Application No. 11201805068Q.
May 29, 2019 Office Action issued in European Patent Application No. 16812778.5.
Feb. 16, 2017 International Search Report issued in International Patent Application No. PCT/EP2016/082036.
Feb. 16, 2017 Written Opinion issued in International Patent Application No. PCT/EP2016/082036.
G. Wang et al. "Sector V: Vacuum dehydrated concrete." New Building Construction Techniques. Shandong Science and Technology Press Pages, Nov. 1994, pp. 248-249 (English Translation).

* cited by examiner

Primary Examiner — Sheeba Ahmed
(74) Attorney, Agent, or Firm — Oliff PLC

(57) ABSTRACT

A cementitious adhesive composition, in particular a tile adhesive, especially for use in automatic tiling systems, includes 10-70 wt.-% of a hydraulic binder, in particular cement, 20-90 wt.-% of aggregates, in particular sand and/or calcium carbonate, and 0.01-5 wt.-% cellulose ether.

9 Claims, 1 Drawing Sheet

CEMENTITIOUS ADHESIVE COMPOSITION

TECHNICAL FIELD

The invention relates to a cementitious adhesive composition, in particular a tile adhesive, especially for use in automatic tiling systems as well as a processable composition comprising such an adhesive composition. Also, the invention is concerned with a method for producing and application of a processable composition, with a shaped body and with the use of an adhesive composition or a processable composition as an adhesive in an automatic tiling system.

BACKGROUND ART

Nowadays, the covering of floors, walls or ceilings with tiles ("tiling") usually is performed manually by a specialist, i.e. a tiler or paver, respectively. Tiling is a physically hard and very time-consuming work which needs a lot of expertise. If a tiling job is not performed correctly, uneven or irregular tiled surfaces are obtained which for aesthetic reasons often are not accepted by the building owners. In this case the tiled surfaces have to be repaired or fully replaced. Repairing or replacing a tiled surface is very laborious, generates a lot of dust and is expensive.

It would therefore be highly desirable to automate the tiling process in order to reduce costs, safe time, increase reliability of tiling processes and improve quality of tiled surfaces in order to minimize repair works.

A robot able to position tiles over a floor or wall surface with high precision ("tiling robot") is an example of a suitable embodiment of an automated tiling system.

However, a tiling robot or any other automated tiling system will have full functionality only if it includes the automatic application of a suitable adhesive composition, typically via high pressure pumping systems.

In this regard, DE 198 21 612 A1 (Fraunhofer-Gesellschaft zur Förderung der angewandten Forschung e.V.) describes a system for automatic application of a an adhesive composition.

However, current adhesive compositions are designed for manual application. They contain a significant amount of dispersed air (up to 30% of the volume) which is necessary to entail sufficient softness so that manual application is possible. Due to its high air content, a classical adhesive composition is highly sensitive to pressure, which when applied with a high pressure pump results in large air voids and leads to overshooting or afterflowing problems, preventing precise dosing and metering.

Simple removal of air by vacuum may eliminate the pressure sensitivity of classical adhesive compositions but results in a very hard adhesive of high viscosity, which cannot be pumped properly.

There is thus a need to develop new and improved adhesive compositions which can be used in automated tiling systems and which overcome the aforementioned drawbacks.

DISCLOSURE OF THE INVENTION

It is an object of the present invention to provide an improved cementitious adhesive composition, in particular a tile adhesive, which can be used in automated systems, in particular in automated tiling systems or in tiling robots. Especially, the adhesive composition should be pumpable with high pressure pumping systems. Thereby, the adhesive composition should be easy to pump and at the same time allow for accurate dosing and metering. Particularly, the adhesive composition should have a reduced tendency of overshooting or afterflowing.

Surprisingly, it has been found that these objects are achieved by the features of claim 1. Thus, the core of the invention is a cementitious adhesive composition, in particular a tile adhesive, especially for use in automatic tiling systems, comprising or consisting of:
a) 10-70 wt.-% of a hydraulic binder, in particular cement;
b) 20-90 wt.-% of aggregates, in particular silica and/or calcium carbonate;
c) 0.01-5 wt.-% cellulose ether.

It has been shown that such adhesive compositions can be reliably pumped and precisely metered. Hence, the inventive cementitious adhesive compositions are highly advantageous for automatic application or for use with automated tiling systems, respectively. The adhesive composition has been proven to be especially advantageous if used as a tile adhesive. Compared to classical adhesive compositions for manual application, the inventive adhesive composition shows a significantly reduced tendency to overshooting or afterflowing when applied with high pressure pumps.

Additional aspects of the invention are subject of further independent claims. Particularly preferred embodiments are outlined throughout the description and the dependent claims.

WAYS OF CARRYING OUT THE INVENTION

A first aspect of the invention relates to a cementitious adhesive composition, in particular a tile adhesive, especially for use in automatic tiling systems, comprising or consisting of:
a) 10-70 wt.-% of a hydraulic binder, in particular cement;
b) 20-90 wt.-% of aggregates, in particular silica and/or calcium carbonate;
c) 0.01-5 wt.-% cellulose ether.

In particular, all the amounts are with respect to the total weight of the adhesive composition.

Especially preferred, the cementitious adhesive composition is a tile adhesive.

In the present context, a "tile" is in particular a manufactured piece of hard-wearing material such as ceramic, stone, metal, and/or glass. Typically, tiles are used for covering roofs, floors, walls, and/or showers.

In particular, the tile is a ceramic tile, a tile made of natural stone and/or a modular tile. The definition, classification, characteristics and marking of ceramic tiles is provided in European Standard EN 14411. Analogously, the definitions and specifications/requirements for natural stone products and modular tiles are provided in European Standard EN 12057.

In the present context, the expression "hydraulic binder" in particular stands for substances that harden because of hydration chemical reactions producing hydrates. Preferably the hydrates produced are not water-soluble. In particular, the hydration chemical reactions of the hydraulic binder takes essentially place independently of the water content. This means that the hydraulic binder can harden and retain its strength even when exposed to water, e.g. underwater or under high humidity conditions.

"Cellulose ethers" are derivatives of cellulose. Specifically, with cellulose ethers hydrogen atoms of hydroxyl groups are partially or fully substituted, typically with alkyl groups, hydroxyalkyl groups, carboxy groups and/or carboxy alkyl groups. In particular, the alkyl groups comprise methyl, ethyl and/or propyl radicals.

Especially, the cellulose ether is a water-soluble cellulose ether.

Preferably, the cellulose ether is selected from hydroxymethyl cellulose, hydroxyethyl cellulose, hydroxypropyl methylcellulose, hydroxyethyl methylcellulose and/or carboxymethyl cellulose. Especially preferred are hydroxypropyl methylcellulose and/or hydroxylethyl methylcellulose. Such kind of cellulose ether have been proven to be especially suitable in the present invention. However, for special applications, other cellulose ethers may be suitable as well.

According to a preferred embodiment, an amount of cellulose ether is 0.05-3 wt.-%, in particular 0.1-1 wt.-%, especially 0.2-0.6 wt.-%.

Especially, the cementitious adhesive composition is present as a dry mixture. This means that the adhesive composition is essentially free of water or an amount of water is below 1 wt.-%, in particular below 0.5 wt.-% or below 0.1 wt.-%, with respect to the total weight of the adhesive composition.

According to a preferred embodiment, the cementitious adhesive composition is a one-component mixture. That means that all the individual materials and/or substances are intermixed. One-component compositions are in particular easy to handle and exclude the risk of a mix up or wrong dosing of individual components by users.

However, it is in principle possible to provide a two-component cementitious adhesive composition or even a multi-component cementitious adhesive composition. A first component may e.g. be present in a first receptacle comprising the hydraulic binder and the cellulose ether. A second component, present in a second receptacle, may comprise the aggregates and optionally water. Other distributions are possible as well. Two- or multi-component mortar compositions allow e.g. for adjusting the adhesive composition with regard to specific applications.

Preferably, the hydraulic binder comprises or consists of cement. Preferably the cement is Portland cement and/or alumina cement and/or sulphoaluminate cement and/or a ternary binder. Mixtures of Portland cement and alumina cement are possible as well. A ternary binder may comprise or consist of alumina cement, calcium sulphate and optionally Portland cement.

Preferred Portland cement is according to norm EN 197, in particular of type OEM I. The term "alumina cement" stands in particular for a cement with an aluminum content, measured as $Al_2O_3$, of at least 30 wt.-%, especially at least 35 wt.-%, in particular 35-58 wt.-%. Preferably, the alumina cement is alumina cement according to standard EN 14647.

Moreover, the hydraulic binder can optionally comprise or consist of latent hydraulic and/or pozzolanic binder materials. The term "latent hydraulic and/or pozzolanic binder materials" stands in particular for type II concrete additives with latent hydraulic and/or pozzolanic character according to EN 206-1. In particular, the latent hydraulic or pozzolanic binder material comprises or consists of slag, fly ash, silica fume, metacaolin and/or natural pozzolanes.

According to a further preferred embodiment, the hydraulic binder comprises or consists of 10-95 wt. % of hydraulic binder, in particular Portland cement and/or alumina cement, and 90-5 wt. % of latent hydraulic and/or pozzolanic binder material. More preferably, the binder composition comprises or consists of 30-90 wt. % of hydraulic binder and 70-10 wt. % of latent hydraulic and/or pozzolanic binder material.

A preferred amount of hydraulic binder is 20-50 wt.-%, in particular 30-50 wt.-%, with respect to the total weight of the adhesive composition.

Preferred aggregates are selected from sand, quartz, calcium carbonate, natural river sand and/or metallic aggregates. The grain size of the aggregates is preferably at most 4 mm, in particular at most 2 mm, especially at most 1 mm. However, other aggregates may be used as well for specific purposes.

In particular, an amount of the aggregates is 25-60 wt.-%, in particular 50-60 wt.-%, with respect to the total weight of the adhesive composition.

According to an advantageous embodiment, the cementitious adhesive composition further comprises 0.1-10 wt.-%, in particular 0.1-5 wt.-%, of a polymer. An especially preferred amount of the polymer is 1-4 wt.-%, with respect to the total weight of the adhesive composition.

Preferably, the polymer is a water soluble or water redispersible polymer, in particular a water redispersible polymer. Such polymers have proven to be beneficial in the present mortar compositions. However, e.g. for specific purposes, other polymers might be suitable as well.

Especially the polymer is a homopolymer or copolymer based on one or more monomers selected from vinyl acetate, vinyl ester, vinyl alcohol, acrylic acid, acrylate, methacrylic acid, methacrylate and ethylene.

Preferably, the polymer is selected from polyvinyl esters, polyvinyl alcohols, polyacrylates, polymethacrylates, butylacrylates, vinylversatate or mixtures thereof. Especially, the polymer is selected from polyacrylate, poly(vinyl acetate), poly(vinyl alcohol), ethylene-vinyl acetate copolymer, ethylene-vinyl alcohol copolymer or mixtures thereof. However, other water-soluble polymers might be suitable as well.

According to another preferred embodiment, the cementitious adhesive composition comprises at least one plasticizer. In particular, the plasticizer is chemically different from the above mentioned polymer. The plasticizer is in particular selected from the group of lignosulfonates, gluconates, naphtalenesulfonates, melamine sulfonates, vinyl copolymers, casein, polycarboxylates and/or polycarboxylate ethers. Polycarboxylate ethers are especially preferred.

It is also possible to use a combination of several different plasticizers.

A preferred amount of plasticizer is chosen within a range 0.001-10 wt.-%, in particular 0.01-5 wt.-%, preferably, 0.1-1 wt.-%, in particular 0.1-0.5 wt.-%, with respect to the total weight of the adhesive composition.

Advantageously, the cementitious adhesive composition comprises 0.05-2.0 wt.-%, especially 0.1-0.8 wt.-%, in particular 0.1-0.5 wt.-%, of a defoamer.

The defoamer is in particular selected from silicon based defoamers and/or glycol based defoamers and/or ethoxylate fatty alcohol based defoamers and/or a mixture thereof. A suitable glycol based defoamer is a polyalkylene glycol and/or an ethylenoxide/propylenoxide copolymer. A preferred silicon based defoamer is polysiloxane.

Moreover, suitable defoamers may comprise or consist of (i) mixtures of dodecyl alcohol and propylene glycol, (ii) fatty alcohol ethyloxates, (iii) dibutylphtalates, (iv) dibutylphosphates, (v) silicone polymers and (vi) aqueous emulsions of silane, siloxane and/or silicone.

According to an especially preferred embodiment, the defoamer comprises a mixture of polyalkylene glycol and hydrocarbons.

Especially, the defoamer comprises a mixture of an alkoxylated fatty alcohol and a polyetherol fatty acid on an inert carrier material.

In a further preferred embodiment, the cementitious adhesive composition additionally comprises 5-40 wt.-%, especially 20-40 wt.-%, preferably 25-35 wt.-%, of a filler. In particular, the term "filler" stands for rock flour or aggregates, respectively, which passes a sieve with a mesh size of 0.063 mm. The filler is in particular chosen from silica and/or calcium carbonate. Especially, the filler material is different from the aggregates present in the adhesive composition.

According to a preferred embodiment, the cementitious adhesive composition further comprises a layered material. The term "layered material" stands in particular for a material with a layered crystal structure. Especially, the layered material is a plate-like material. A plate-like material is in particular a material with a length and width larger than its thickness.

Preferably, the layered material is selected from clay and/or mica. Within the context of this invention, "clay" stands in particular for phyllosilicates and/or sheet silicates. Especially preferred, the layered material comprises or consists of Bentonite, Hectorite, Attapulgite, Sepiolith and/or Vermiculite.

In particular, a grain size of the layered material is 4 mm at most, preferably 2 mm at most, especially 1 mm at most.

A preferred amount of layered material is 0.001-5 wt.-%, in particular 0.01-2 wt.-%, especially 0.1-1 wt.-%, with respect to the total weight of the adhesive composition.

Additionally the cementitious adhesive composition may comprise 0.001-5 wt.-%, in particular 0.01-2, especially 0.1-1 wt.-% or 0.2-0.5 wt.-%, with respect to the total weight of the adhesive composition, of starch. Starch is a polysaccharide.

According to another preferred embodiment, the cementitious adhesive composition comprises fibers. Fibers may be used to strengthen the tensile strength of the adhesive composition after hardening. Preferably, the fibers are selected from cellulose, polypropylene and/or acrylonitrile fibers. In particular, an amount of fibers is 0.001-2 wt.-%, especially 0.01-1 wt.-%, preferably 0.1-0.5 wt.-%, with respect to the total weight of the adhesive composition.

Additionally, the cementitious adhesive composition may comprise retarders. Retarders can be used in order to extend the processing time of the adhesive composition and/or to counteract the accelerating effect of high temperatures. Especially, the retarder is chosen from carbohydrates, phosphates, hydroxycarboxylic acids and/or salts thereof. An especially preferred retarder is gluconate, in particular sodium gluconate. Preferably, an amount of retarder is 0.001-2 wt.-%, especially 0.01-1 wt.-%, preferably 0.1-0.5 wt.-%. with respect to the total weight of the adhesive composition.

In another preferred embodiment, the cementitious adhesive composition comprises a latex or an aqueous polymer dispersion, respectively. In the present document, a "polymer dispersion" is understood to mean a dispersion of polymer particles in an aqueous phase. Particularly, a dispersion is stable for a long time, i.e. typically at room temperature for at least one week without precipitations.

If the cementitious adhesive composition comprises a latex, the adhesive composition is preferably present as a two-component composition or a multi-component composition. Thereby, the latex is preferably present in a component separate from a component comprising the hydraulic binder. For example, the hydraulic binder, the aggregates and the cellulose ether and any other of the above mentioned non-aqueous substances and materials are present in a first receptacle or a first component, respectively, whereas the latex is present in a second receptacle or a second component, respectively.

Especially the latex is an aqueous dispersion of at least one dispersed homopolymer and/or copolymer. In particular, the homopolymer and/or copolymer is composed of at least one monomer, in particular at least two, three or more different monomers, selected from the group consisting of ethylene, propylene, butylene, isoprene, butadiene, styrene, acrylonitrile, acrylic acid, methacrylic acid, alkyl acrylate, alkyl methacrylate, vinyl ester, vinyl acetate and vinyl chloride.

Particularly suitable polymers are butadiene/styrene copolymers, acrylic acid/styrene copolymers, methacrylic acid/styrene copolymers, ethylene/vinyl acetate copolymers, vinyl acetate/alkyl methacrylate copolymers, and styrene/alkyl methacrylate copolymers, and styrene/alkyl methacrylate copolymers.

Most preferred as dispersed copolymers are butadiene/styrene copolymers.

The size of the polymer particles in the latex is preferably between 50 nanometers and 50 micrometers, preferably between 500 nanometers and 30 micrometers. Due to the particle size, the polymer dispersion is more or less opaque and naturally typically has a milky white color.

The polymer content of the latex is preferably 10-60 wt.-%, especially 25-45 wt.-%, based on the weight of the aqueous polymer dispersion.

In particular, the homopolymer and/or copolymer of the latex is chemically different from the above mentioned polymer and plasticizer.

An especially preferred cementitious adhesive composition comprises or consists of:
a) 20-50 wt.-%, of cement, in particular Portland cement,
b) 25-60 wt.-%, of silica sand,
c) 0.2-0.6 wt.-%, of cellulose ether selected from hydroxypropyl methylcellulose and/or hydroxyethyl methylcellulose,
d) optionally 1-6 wt.-%, especially 1-4 wt.-%, of a redispersable polymer, selected from polyacrylate, poly(vinyl acetate), poly(vinyl alcohol), vinyl ester-vinyl acetate copolymer, ethylene-vinyl acetate copolymer and ethylene-vinyl alcohol copolymer or mixtures thereof,
e) optionally 0.1-1 wt.-%, of a plasticizer, in particular a polycarboxylate ether,
f) optionally 0.1-0.8 wt.-% of a defoamer, in particular selected from silicon based defoamers and/or glycol based defoamers.

According to another example, the cementitious adhesive composition comprises or consists of:
a) 30-50 wt.-%, of cement, in particular Portland cement,
b) 50-60 wt.-%, of silica sand,
c) 0.2-0.6 wt.-%, of cellulose ether selected from hydroxypropyl methylcellulose and/or hydroxyethyl methylcellulose,
d) 1-6 wt.-%, especially 1-4 wt.-% of a redispersable polymer, selected from polyacrylate, poly(vinyl acetate), poly(vinyl alcohol), vinyl ester-vinyl acetate copolymer, ethylene-vinyl acetate copolymer and ethylene-vinyl alcohol copolymer or mixtures thereof,
e) 0.1-0.5 wt.-%, of a plasticizer, in particular a polycarboxylate ether,
f) 0.1-0.5 wt.-% of a defoamer, in particular selected from silicon based defoamers and/or glycol based defoamers.

The following four exemplary cementitious adhesive compositions have been proven to be especially beneficial:

1) A cementitious adhesive composition comprising or consisting of:
   a) 15-25 wt.-%, of cement, in particular Portland cement,
   b) 40-50 wt.-%, of silica sand,
   c) 0.05-0.2 wt.-%, of cellulose ether selected from hydroxypropyl methylcellulose and/or hydroxylethyl methylcellulose.
   d) 30-35 wt.-% filler, in particular limestone or calcium carbonate filler.
2) A cementitious adhesive composition comprising or consisting of:
   a) 40-50 wt.-%, of cement, in particular Portland cement
   b) 45-55 wt.-%, of silica sand,
   c) 0.2-0.6 wt.-%, of cellulose ether selected from hydroxypropyl methylcellulose and/or hydroxylethyl methylcellulose,
   d) 2.5-3.5 wt.-%, of a redispersable polymer, selected from polyacrylate, poly(vinyl acetate), poly(vinyl alcohol), vinyl ester-vinyl acetate copolymer, ethylene-vinyl acetate copolymer and ethylene-vinyl alcohol copolymer or mixtures thereof.
3) A cementitious adhesive composition comprising or consisting of:
   a) 35-45 wt.-%, of cement, in particular Portland cement
   b) 25-35 wt.-%, of silica sand,
   c) 0.2-0.4 wt.-%, of cellulose ether selected from hydroxypropyl methylcellulose and/or hydroxylethyl methylcellulose,
   d) 0.8-2.5 wt.-%, of a redispersable polymer, selected from polyacrylate, poly(vinyl acetate), poly(vinyl alcohol), vinyl ester-vinyl acetate copolymer, ethylene-vinyl acetate copolymer and ethylene-vinyl alcohol copolymer or mixtures thereof,
   e) 20-30 wt.-% filler, in particular limestone or calcium carbonate filler,
   f) 0.01-0.1 wt.-% of retareder, in particular a sodium gluconate.
4) A cementitious adhesive composition comprising or consisting of:
   a) 35-45 wt.-%, of cement, in particular Portland cement
   b) 50-60 wt.-%, of silica sand,
   c) 0.3-0.5 wt.-%, of cellulose ether selected from hydroxypropyl methylcellulose and/or hydroxylethyl methylcellulose,
   d) 2-6 wt.-%, especially 1-4 wt.-% of a redispersable polymer, selected from polyacrylate, poly(vinyl acetate), poly(vinyl alcohol), vinyl ester-vinyl acetate copolymer, ethylene-vinyl acetate copolymer and ethylene-vinyl alcohol copolymer or mixtures thereof,
   e) 0.2-0.5 wt.-%, of a plasticizer, in particular a polycarboxylate ether,
   f) 0.2-0.5 wt.-% of a defoamer, in particular selected from silicon based defoamers and/or glycol based defoamers.

In another aspect, the present invention relates to a processable composition comprising a cementitious adhesive composition as described above and water. Thereby, all of the components of the adhesive composition as well as the water are intermixed. A "processable composition" is meant to be an adhesive composition which is ready to be applied to a support element, e.g. a floor structure, in order to fix a cover element, for example a tile. In particular, the processable composition is at the initial stage of setting of the hydraulic binder. Preferably, a weight ratio of water to hydraulic binder in the processable composition is chosen in the range of 0.3-0.8, in particular 0.35-0.7, especially 0.35-0.5.

Especially, an air content of the processable composition is 0-5%, in particular 0.1-3%. The air content is measured for example according to DIN EN 1015-7 As it has been shown, keeping the air content at a rather low level is highly beneficial for obtaining a processable composition which can accurately be dosed and metered in automatic tiling systems.

Also, the present invention relates to a method for producing such a processable composition whereby an adhesive composition as described above is intermixed with water.

According to an especially preferred embodiment, air is actively removed at least during intermixing of the adhesive composition and water. Also it is possible to remove air from the processable composition after intermixing, e.g. during a storage period. This allows for a further reduction of the air content of the processable composition. Preferably, the air is removed with underpressure, e.g. by subjecting the mixing and/or storage receptacle to underpressure, for example with the help of an external vacuum pump. Typically, the underpressure applied is about 25-400 mbar, in particular about 50-200 mbar.

An especially preferred method for producing a processable composition comprises or consists of the following steps:
i. Mixing a cementitious adhesive composition as described above, in particular comprising 10-70 wt.-% of a hydraulic binder, preferably cement, 20-90 wt.-% of aggregates, in particular sand and/or calcium carbonate, 0.01-5 wt.-% cellulose ether;
ii. Adding water, preferably with a weight ratio of water to hydraulic binder chosen in the range of 0.3-0.8, in particular 0.35-0.7, especially 0.35-0.5;
iii. Intermixing of the adhesive composition and water;
iv. Optionally, removing air, preferably during the intermixing of the adhesive composition and water, especially so that an air content is 0-5%, in particular 0.1-3%.

According to another aspect, the present invention is concerned with a method for the application of a processable composition, comprising the steps of producing a processable composition as described above and subsequently applying the so produced processable composition on a support element and/or on a cover element. Preferably, the processable composition is applied on the support element.

The support element can e.g. be a floor, a wall or a ceiling structure. Preferably, the cover element is a tile.

Preferably, the processable composition is applied with a thickness of 0.5-10 mm, in particular 3-6 mm.

Especially, the processable composition is applied with a pumping system, in particular with a pumping system of an automatic tiling system, especially with a tiling robot. The automatic tiling system can e.g. be similar to the one described in DE 198 21 612 A1.

For example, the cementitious adhesive composition or the processable composition, respectively, is pressurized in the pumping system with a pressure of 0.5-30 bar, in particular 1-20 bar, especially 5-15 bar or 10-13 bar.

Especially preferred, a method for the application of a processable composition comprises or consist of the following steps:
1. Producing a processable composition according to the method for producing a processable composition comprising or consisting of the steps i, ii, iii and iv as described above;
2. Applying the processable composition on a support element and/or on a cover element, especially with a pumping system, in particular with a pumping system of an automatic tiling system, in particular for fixing the cover element, for example a tile, on the support element.

Furthermore, the present invention relates to a shaped body, in particular a flat layer, comprising a hardened processable composition as described above. Thus, the shaped body is obtainable by hardening the processable composition. In particular, the shaped body is arranged between a support element and a cover element, and preferably the cover element is a tile. Especially, the shaped body is an adhesive layer between a support element, e.g. a floor, wall or ceiling structure, and a cover element, for example a tile.

In particular, the shaped body is a flat layer, especially with a thickness of 0.5-10 mm, preferably 3-6 mm. Within the present context, a flat layer is in particular a body with a width and a length larger than its thickness.

Also, the present invention relates to a structure, in particular a floor, a wall or a ceiling, comprising the shaped body as described above, whereby the shaped body is arranged between a support element and cover element. In particular, the support element is a floor, a wall or a ceiling structure, and/or the cover element is a tile.

Optionally, it is possible to have additional layers, e.g. primer layers, between the support element and the shaped body. This might further increase the adhesion between the support element and the shaped body.

According to a further aspect, the present invention is related to a method for the production of an above mentioned structure, whereby a processable composition as described above is applied on a support element and/or on a cover element and subsequently the cover element is placed on the support element.

Another aspect of the present invention is directed to the use of a cementitious adhesive composition as describe above or of a processable composition as described above as an adhesive, preferably in an automatic application system, more preferred in an automated tiling system or a tiling robot.

Further advantageous configurations of the invention are evident from the exemplary embodiments.

EXEMPLARY EMBODIMENTS

1. Cementitious Adhesive Compositions

Table 1 shows four inventive adhesive compositions A1-A4. The compositions have been prepared by intermixing all of the commercially available components in dry state. The adhesive composition A1-A4 are present as dry powders and can preferably be used as tile adhesives.

TABLE 1

| Component | A1 | A2 | A3 | A4 |
|---|---|---|---|---|
| Hydraulic binder [wt-%] Portland cement | 21.0 | 45.0 | 42.0 | 40.0 |
| Aggregate [wt-%] Sand (0-1 mm) | 45.0 | 51.1 | 29.33 | 56.0 |
| Cellulose ether [wt.-%] hydroxylethyl ethylcellulose | 0.1 | 0.4 | 0.30 | 0.40 |
| Limestone filler [wt-%] | 33.9 | — | 26.75 | — |
| Polymer [wt-%] Ethylene-vinyl acetate copolymer | — | 3.5 | 1.60 | 3.0 |
| Plasticizer [wt.-%] Polycarboxylate ether | — | — | — | 0.3 |
| Defoamer [wt.-%] Mixture of alkoxylated fatty alcool and a polyetherol fatty acid on an inert carrier material (Lumiten ®) | — | — | — | 0.3 |
| Retarder [wt.-%] Sodium gluconate | — | — | 0.03 | — |

2. Preparation of Processable Compositions

Processable compositions C1-C4 have been obtained by intermixing the dry adhesive compositions A1-A4 with water (weight ratio of water to total weight of dry adhesive composition=0.25-0.26.

For comparison, a reference composition R has been produced with a commercially available adhesive composition for manual application in a similar manner.

Subsequently, the air content has been determined according to DIN EN 1015-7.

All of the so processable compositions C1-C4 had an air content of about 1-2%. In contrast, the reference composition had an air content of about 20%.

3. Application

The processable compositions C1-C4 as well as the reference composition R have been applied with a pump system and an application head with a profiled slot nozzle (comparable to the one described in DE 198 21 612 A1) with a thickness of 3-6 mm on a cleaned flat plate under identical conditions.

Figure 1:
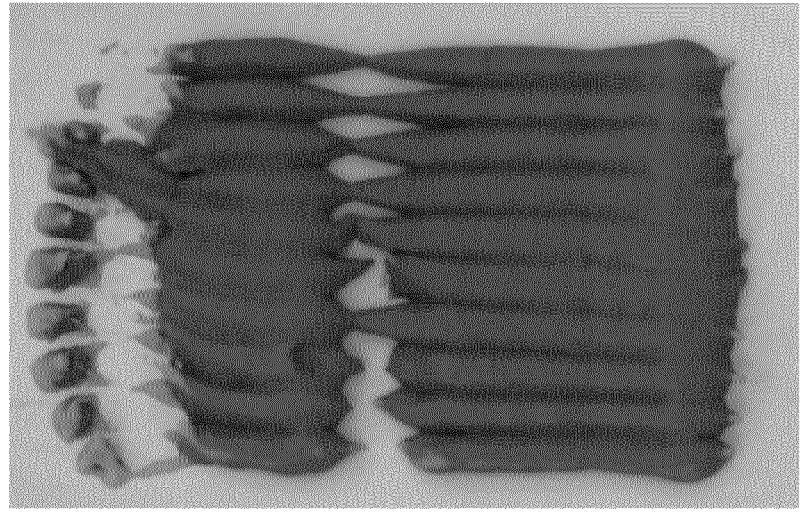
FIG. 1 shows a photograph of a cementitious adhesive layer which has been produced by application of a conventional tile adhesive with a high pressure pump system and an application head with a profiled slot nozzle.
Figure 2:
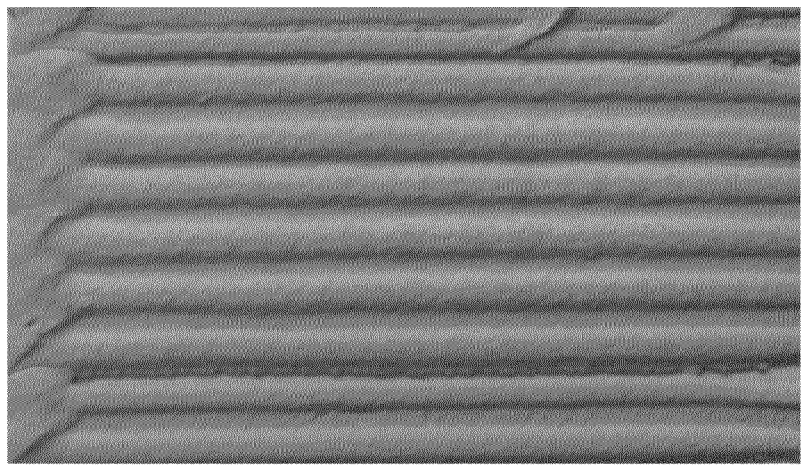
FIG. 2 shows a photograph of a cementitious adhesive layer which has been produced in a similar manner by application of a tile adhesive according to the invention.

FIG. 1 shows a photograph of the so applied reference composition R with large air voids which are caused by inhomogeneous flow behavior of the adhesive composition during application. In contrast, with inventive composition C1 (FIG. 2), a very homogeneous adhesive layer without any voids is produced.

Thus, adhesive compositions according to the present invention are highly beneficial for use as adhesive in automatic tiling systems.

It will be appreciated by those skilled in the art that the present invention can be embodied in other specific forms without departing from the spirit or essential characteristics thereof. The presently disclosed embodiments are therefore considered in all respects to be illustrative and not restricted.

The invention claimed is:

1. Method for the application of a processable composition, comprising the steps of
    producing a processable composition comprising a cementitious adhesive composition comprising:
        a) 10-70 wt.-% of a hydraulic binder,
        b) 20-90 wt.-% of aggregates,
        c) 0.01-5 wt.-% cellulose ether,
        and water;
wherein
    a weight ratio of the water to the hydraulic binder in the range of from 0.3-0.8, and the processable composition has an air content of 0-5 Vol-%; and subsequently applying the produced processable composition on a support element and/or on a cover element with a pumping system.

2. The method of claim 1, wherein the cementitious adhesive composition further comprises 0.1-10 wt.-%, of a polymer.

3. The method of claim 1, wherein the cementitious adhesive composition further comprises 0.001-10 wt.-% of a plasticizer.

4. The method of claim 1, wherein the cementitious adhesive composition further comprises 0.05-2.0 wt.-% of a defoamer.

5. The method of claim 1, wherein the cellulose ether is selected from hydroxymethyl cellulose, hydroxyethyl cellulose, hydroxypropyl methylcellulose, hydroxylethyl methylcellulose and/or carboxymethyl cellulose.

6. The method of claim 1, wherein the cementitious adhesive composition comprises:
   a) 20-50 wt.-%, of cement,
   b) 25-60 wt.-%, of silica sand,
   c) 0.2-0.6 wt.-%, of cellulose ether selected from hydroxypropyl methylcellulose and/or hydroxylethyl methylcellulose,
   d) optionally 1-6 wt.-%, of a redispersable polymer, selected from polyacrylate, poly(vinyl acetate), poly(vinyl alcohol), vinyl ester-vinyl acetate copolymer, ethylene-vinyl acetate copolymer and ethylene-vinyl alcohol copolymer or mixtures thereof,
   e) optionally 0.1-1 wt.-%, of a plasticizer,
   f) optionally 0.1-0.8 wt.-% of a defoamer.

7. The method of claim 1, wherein the cementitious adhesive composition comprises:
   a) 30-50 wt.-%, of cement,
   b) 50-60 wt.-%, of silica sand,
   c) 0.2-0.6 wt.-%, of cellulose ether selected from hydroxypropyl methylcellulose and/or hydroxylethyl methylcellulose,
   d) 1-6 wt.-%, of a redispersable polymer, selected from polyacrylate, poly(vinyl acetate), poly(vinyl alcohol), vinyl ester-vinyl acetate copolymer, ethylene-vinyl acetate copolymer and ethylene-vinyl alcohol copolymer or mixtures thereof,
   e) 0.1-0.5 wt.-%, of a plasticizer,
   f) 0.1-0.5 wt.-% of a defoamer.

8. The method of claim 1, wherein the air content of the processable composition is 0.1-3 Vol-%.

9. The method according to claim 1, wherein at least during intermixing of the components of the processable composition during the production of the processable composition, air is actively removed.

* * * * *